US008358906B2

(12) United States Patent
Takai et al.

(10) Patent No.: US 8,358,906 B2
(45) Date of Patent: Jan. 22, 2013

(54) CONTENT PLAYBACK METHOD AND CONTENT PLAYBACK APPARATUS

(75) Inventors: Motoyuki Takai, Tokyo (JP); Toshiro Terauchi, Tokyo (JP); Yoichiro Sako, Tokyo (JP); Yasushi Miyajima, Kanagawa (JP); Kosei Yamashita, Kanagawa (JP); Makoto Inoue, Tokyo (JP); Masamichi Asukai, Kanagawa (JP); Katsuya Shirai, Kanagawa (JP); Kenichi Makino, Kanagawa (JP)

(73) Assignee: Sony Corporation, Tokyo (JP)

( * ) Notice: Subject to any disclaimer, the term of this patent is extended or adjusted under 35 U.S.C. 154(b) by 1062 days.

(21) Appl. No.: 11/665,578

(22) PCT Filed: Oct. 18, 2005

(86) PCT No.: PCT/JP2005/019098
§ 371 (c)(1),
(2), (4) Date: Apr. 2, 2008

(87) PCT Pub. No.: WO2006/043536
PCT Pub. Date: Apr. 27, 2006

(65) Prior Publication Data
US 2009/0003802 A1 Jan. 1, 2009

(30) Foreign Application Priority Data
Oct. 18, 2004 (JP) .................... 2004-302686

(51) Int. Cl.
H04N 9/80 (2006.01)
(52) U.S. Cl. ........................................ 386/239
(58) Field of Classification Search ............. 386/46, 386/239
See application file for complete search history.

(56) References Cited

U.S. PATENT DOCUMENTS

| 4,525,074 A | 6/1985 | Murakami |
| 5,583,776 A | 12/1996 | Levi et al. |
| 6,506,969 B1 | 1/2003 | Baron |
| 2001/0015123 A1* | 8/2001 | Nishitani et al. ............. 84/615 |
| 2004/0000225 A1* | 1/2004 | Nishitani et al. ............. 84/610 |

FOREIGN PATENT DOCUMENTS
EP 1 533 784 5/2005
(Continued)

OTHER PUBLICATIONS

M. Goto, "An Audio-based Real-time Beat Tracking System for Music With or Without Drum-sounds", Journal of New Music Research, vol. 30, No. 2, pp. 159-171, May 2001.

(Continued)

Primary Examiner — Kambiz Zand
Assistant Examiner — Teshome Hailu
(74) Attorney, Agent, or Firm — Rader Fishman & Grauer, PLLC

(57) ABSTRACT

By allowing the movement of a user to affect the playback of content, the entertainment characteristic or uplifting spirits derived from content playback itself can be enhanced. The timing at which the user places his/her foot on the ground while walking or the timing at which the user shakes or changes from swinging in one direction to swinging to another direction is detected. Then, content, such as a music piece or moving pictures, is played back by allowing the timing of beats or bars of the music piece or the timing of scene changes or cut changes of the moving pictures to be synchronized with the timing of the movement of the user.

19 Claims, 12 Drawing Sheets

FOREIGN PATENT DOCUMENTS

| | | |
|---|---|---|
| EP | 1 585 134 | 10/2005 |
| JP | 09-281963 | 10/1997 |
| JP | 2000-300838 | 10/2000 |
| JP | 2001-195059 | 7/2001 |
| JP | 2001-195060 | 7/2001 |
| JP | 2001-224690 A | 8/2001 |
| JP | 2001-350474 | 12/2001 |
| JP | 2002-065891 | 3/2002 |
| JP | 2002-525688 A | 8/2002 |
| JP | 2002-268635 | 9/2002 |
| JP | 2003-085888 | 3/2003 |
| JP | 2003-111106 | 4/2003 |
| JP | 2004-037575 | 2/2004 |
| JP | 2004-227638 | 8/2004 |
| JP | 2004-228778 A | 8/2004 |
| WO | WO-93/22762 | 11/1993 |
| WO | WO-2004/072767 | 8/2004 |

OTHER PUBLICATIONS

Extended European Search Report issued Jun. 8, 2009 for corresponding European Application No. 05 79 5503.

Russian Office Action issued Jul. 27, 2009 for corresponding Russian Application No. 20071146585/28 (015823).

* cited by examiner

DIRECTIONS IN WHICH
OPERATIONS ARE DETECTED

CONTENT PLAYBACK METHOD AND CONTENT PLAYBACK APPARATUS

TECHNICAL FIELD

The present invention relates to a method and an apparatus for playing back content, such as music or video.

BACKGROUND ART

When playing back music with DVD (Digital Versatile Disc) players, CD (Compact Disc) players, or MD (Mini Disc: registered) players, it is very important to play back music with high quality. The same applies to playing back music compressed using ATRAC (Adaptive Transform Acoustic Coding: registered) or MP3 (MPEG-1 Audio Layer-3) since users eventually listen to time-series signal waveforms transformed from the compressed music.

In contrast, a device that can change content, such as music, in real time in accordance with a current situation of a user is now being considered. For example, the tempo or pitch of music is changed in accordance with a current situation of a user and short sections of music materials are spliced to create one piece of continuous music. From this point of view, the device plays the role of improvising a new piece of music by combining existing pieces of music, which is conventionally conducted by a DJ (Disk Jockey) or VJ (Video Jockey).

When people enjoy music in a concert hall or a discotheque, they stamp, jump, or move their heads back and forth. Swinging in tune with music is not uncommon. Just walking in tune with marching music is pleasant and uplifts your spirits. This proves that synchronizing the rhythm of your physical movements, such as stepping or movement of your head, with the rhythm of content can enhance your spirits or feeling.

According to the invention disclosed in Japanese Unexamined Patent Application Publication No. 2000-300838, in a step game (music direction game), such as "Dance Dance Revolution" (trade name), in which players compete to get a score by stepping in tune with music, play environments that match players' tastes are provided.

According to the invention disclosed in Japanese Unexamined Patent Application Publication No. 2002-65891, the above-described step game is applied to rehabilitation of patients. In this game, the heart rate of a user (patient) is detected and, if the detected heart rate exceeds a reference heart rate, an alarm is issued.

DISCLOSURE OF INVENTION

According to the above-described known content playback method, however, content playback does not react to the movement of a user, but the user acts in accordance with content to be played back, such as stepping in tune with music to be played back. Thus, the entertainment characteristic or uplifting spirits derived from content playback depends on the content itself, and is not sufficient.

This invention has been made to enable the elevation of the entertainment characteristic or uplifting spirits derived from content playback by allowing users' movements to affect the content playback.

According to a content playback method of this invention, a movement of a user is detected, and content is played back by allowing the timing of the content to be synchronized with a feature, a cycle, or a rhythm of the movement.

According to the above-described content playback method, the timing of content to be played back, such as the timing of beats or bars of a music piece to be played back, or the timing of scene changes or cut changes of moving pictures to be played back, is synchronized with the timing at which the user places his/her foot on the ground during walking, or the timing at which the user shakes or changes from swinging in one direction to swinging in other direction. This makes the user who is moving while appreciating or sensing the content feel good, so that the entertainment characteristic and uplifting spirits derived from the content playback itself can be enhanced.

BEST MODE FOR CARRYING OUT THE INVENTION

Figure 1:
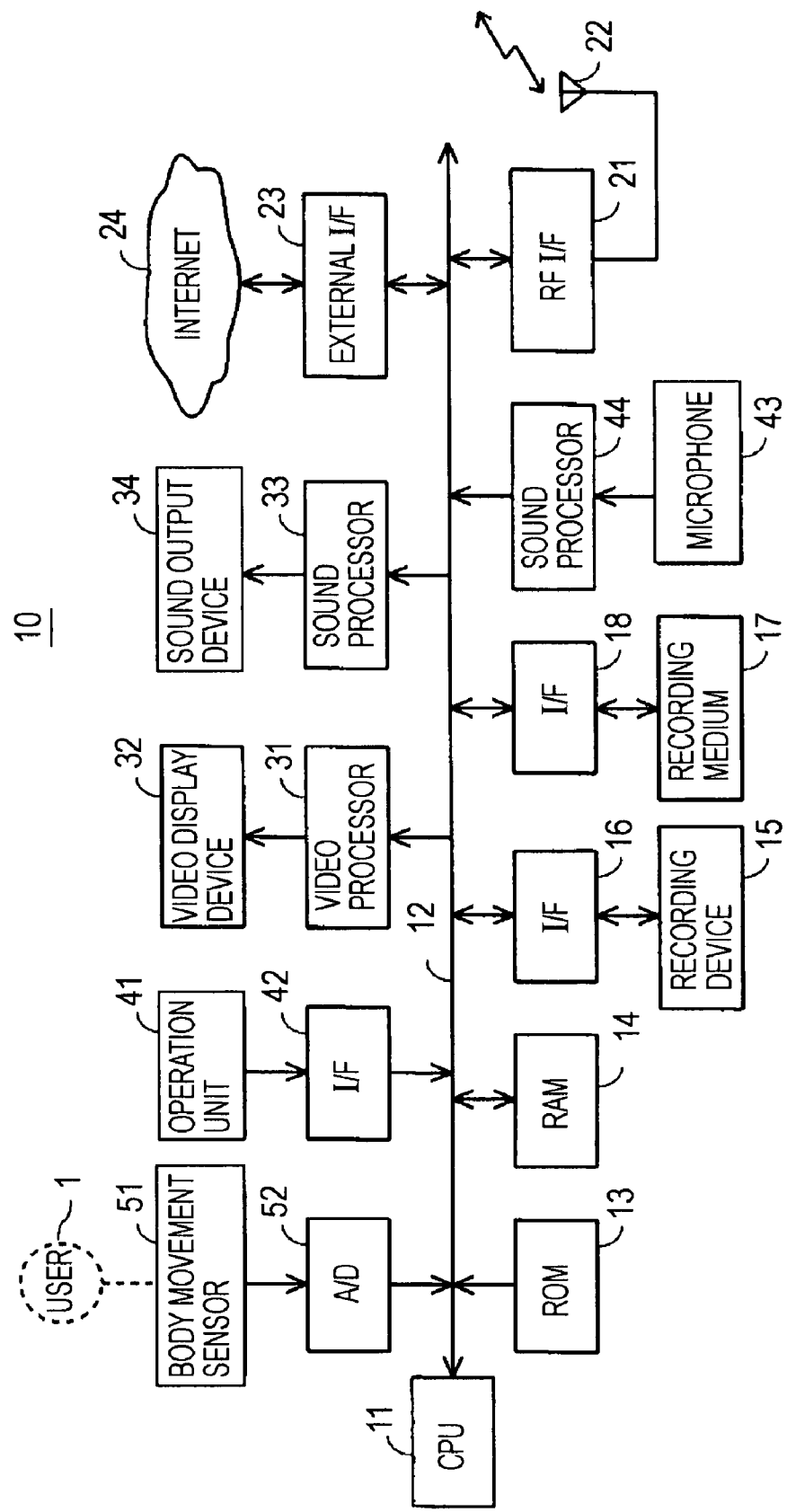
FIG. 1 illustrates an example of a content playback apparatus of this invention.
Figure 2:
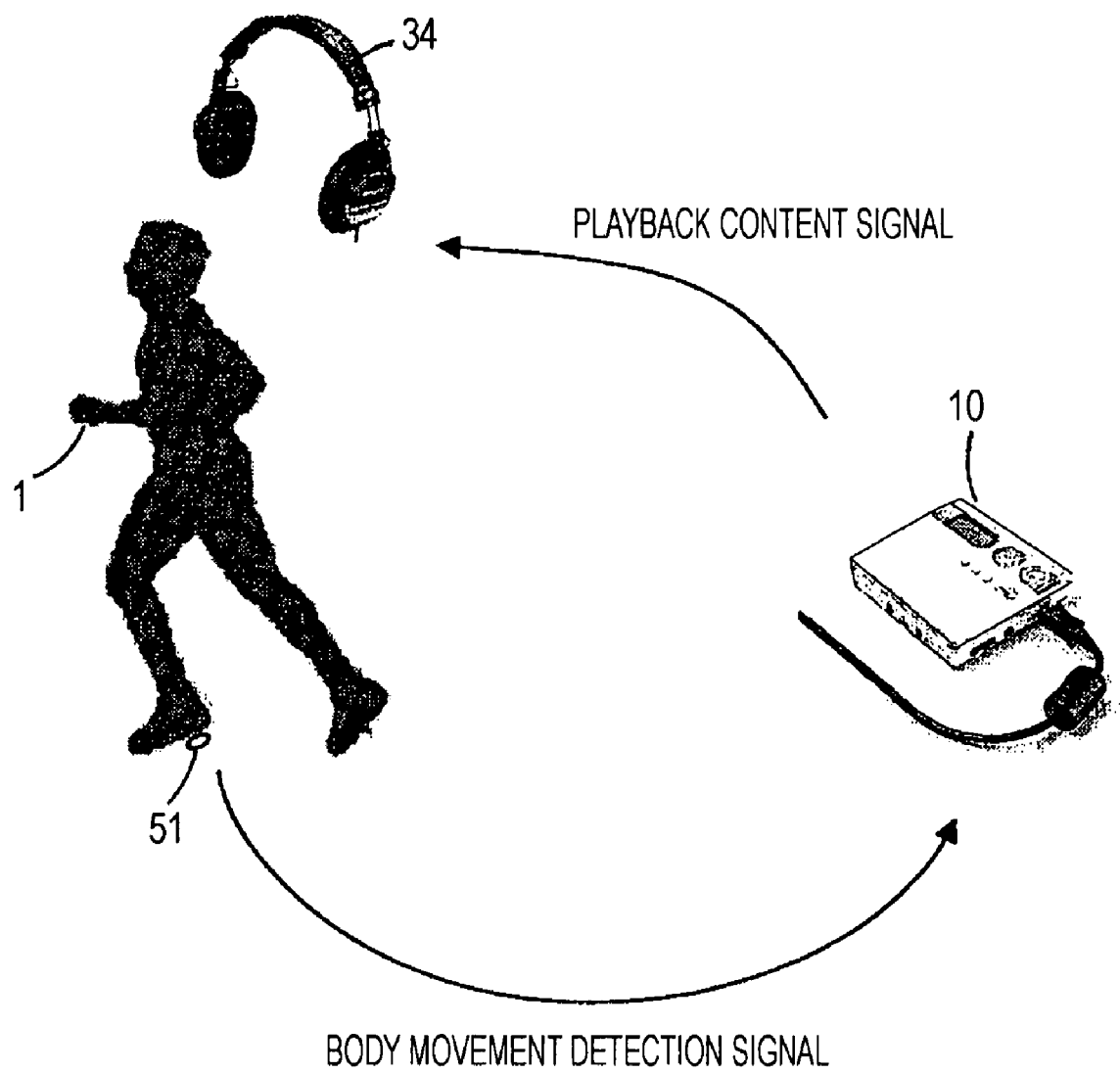
FIG. 2 illustrates an example of an operation performed by the content playback apparatus shown in FIG. 1.
Figure 3:
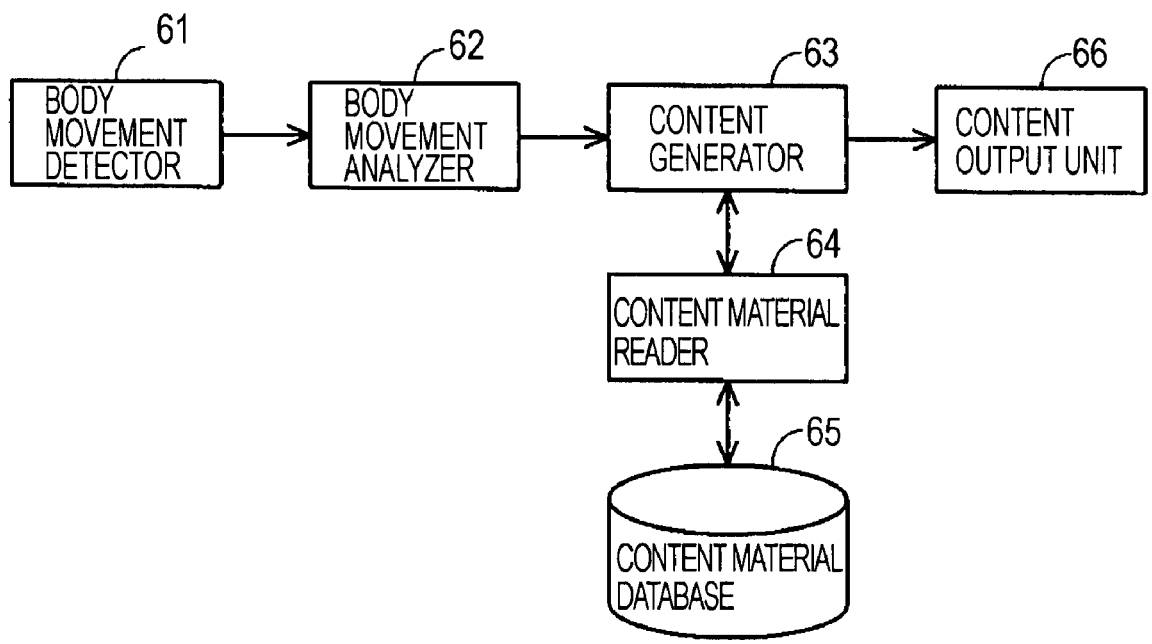
FIG. 3 illustrates the functional configuration of the content playback apparatus shown in FIG. 1.

[1. Embodiment of Content Playback Apparatus: FIGS. 1 through 3]

FIG. 1 illustrates an example of a content playback apparatus of this invention, which is configured as a portable music/video playback device or a cellular telephone terminal.

A content playback apparatus 10 of this example includes a CPU 11. A ROM 13 into which various programs and data are written and a RAM 14 into which programs and data are expanded are connected to a bus 12.

A built-in recording device 15, such as a hard disk, is connected to the bus 12 with an interface 16 therebetween, and a removable recording medium 17, such as a CD or a DVD, is connected to the bus 12 with an interface 18 therebetween. A duplexer antenna 22 is connected to the bus 12 with an RF interface 21, such as an RF duplexer circuit, and an external interface 23 for connecting the content playback apparatus 10 to, for example, the Internet 24, is connected to the bus 12.

The recording device 15 and the recording medium 17 record or play back content, such as music or video, or content materials discussed below. The RF interface 21 and the duplexer antenna 22 wirelessly receive or send content or content materials from or to an external source. The external interface 23 receives or sends content or content materials from or to an external source via the Internet 24.

A video display device 32 including, for example, a liquid crystal device, is connected to the bus 12 with a video processor 31 therebetween, and a sound output device 34 including, for example, a speaker and a headphone, is connected to the bus 12 with a sound processor 33 therebetween. On the display screen of the video display device 32, video, which serves as content, or a setting or operating screen, is displayed. Music, which serves as content, or sound, such as voice announcement, is output from the sound output device 34.

An operation unit 41 including various keys is connected to the bus 12 with an interface 42 therebetween, and a sound input microphone 43 is connected to the bus 12 with a sound processor 44 therebetween.

A body movement sensor 51 is connected to the bus 12 with an A/D converter 52 therebetween. A user's movement, which is discussed below, is detected by the body movement sensor 51 and a corresponding movement detection signal is converted from an analog signal into digital data by the A/D converter 52 and is sent to the bus 12.

The content in this invention includes all subjects that can be appreciated or sensed by users, such as music, sound other than music, moving pictures, still images (including graphics, drawings, and characters), vibrations, and light, such as illumination light. In the example shown in FIG. 1, however, the content is music or video.

According to the content playback method used in the content playback apparatus 10 in the example shown in FIG. 1, in a case where, for example, a user 1 listens to music while walking, the timing at which the user 1 places his/her foot on the ground while running is detected, as shown in FIG. 2, by a walking sensor, which serves as the body movement sensor 51, fixed at a shoe worn by the user 1 or a foot of the user 1. Then, music is played back by allowing the timing of beats or bars (measures) of a piece of music to be synchronized with the timing at which the user 1 places his/her foot on the ground, which is discussed below.

The functional configuration of the content playback apparatus 10 shown in FIG. 1 is shown in FIG. 3. A body movement detector 61, which is formed of the body movement sensor 51 and the A/D converter 52, detects user's movements, for example, the movements of the feet while the user is running or the movements of the head while the user is listening to music.

A body movement analyzer 62, which is formed of the CPU 11, the ROM 13, and the RAM 14, analyzes movement detection data that is sent to the bus 12 from the body movement detector 61 to detect a feature, a cycle, or a rhythm (tempo) of the body movement of the user.

The feature of the body movement includes the timing of a start point (point at which the user starts to move the body from the state in which the user is still), an end point (point at which the user starts to bring the body into a standstill from the state in which the user is moving), a maximal point, a minimal point, a maximum peak point, and a minimum peak point of the body movement, and more specifically, the timing at which the user places his/her foot on the ground during walking, or the timing at which the user shakes or changes from swinging in one direction to swinging in another direction during walking.

In this case, detecting the body movement includes predicting the next movement from the previous movement detection result, such as predicting the next timing at which the user places his/her foot on the ground or changes from swinging in one direction to swinging in another direction.

A content generator 63, which is formed of the CPU 11, the ROM 13, the RAM 14, and the video processor 31 or the sound processor 33, drives a content material reader 64 to read out content materials and accompanying timing information from a content material database 65 on the basis of the above-described body movement detection result to generate content in real time.

The content material reader 64 is formed of the CPU 11, the ROM 13, the RAM 14, the interfaces 16 and 18, the RF interface 21, and the external interface 23. The content material database 65 is a database provided in the recording device 15 or the recording medium 17 on which content material data and timing information are recorded, or a server that sends content material data and timing information.

A content output unit 66 outputs content generated by the content generator 63, and is formed of the video display device 32 or the sound output device 34.

The content materials are materials for generating final content, and may be normal content (music data or video data recorded on CDs or DVDs, music data compressed by MP3, etc.). They are, however, preferably short music pieces in the units of bars (several bars), or short video in units of scenes or cuts.

Timing information indicating timing, such as beat timing or scene change timing, is added as meta information to each piece of content material data, and then, the content material data with the timing information is recorded or sent. Alternatively, timing information may be generated simultaneously with the reading of content materials.

If content materials are short music pieces in the units of bars or short video in the units of scenes or cuts, such content materials can be spliced after deciding the temporal order of the content materials, and if necessary, the playback time duration of the content materials is expanded or shortened to generate one piece of content in real time.

[2. Embodiment of Content Playback Method: FIGS. 4 through 8]

In the content playback method of this invention, content is played back by allowing the playback timing of content to be synchronized with a feature, a cycle, or a rhythm of user's movements on the basis of the above-described timing information.

As discussed above, the feature of the movement includes a start point, an end point, a maximal point, a minimal point, a maximum peak point, or a minimum peak point of the body movement, and more specifically, the timing at which the user places his/her foot on the ground during running or the timing at which the user changes from swinging in one direction to swinging in another direction during running.

(2-1. In the Case of Music Content: FIGS. 4 through 8]

Figure 4:
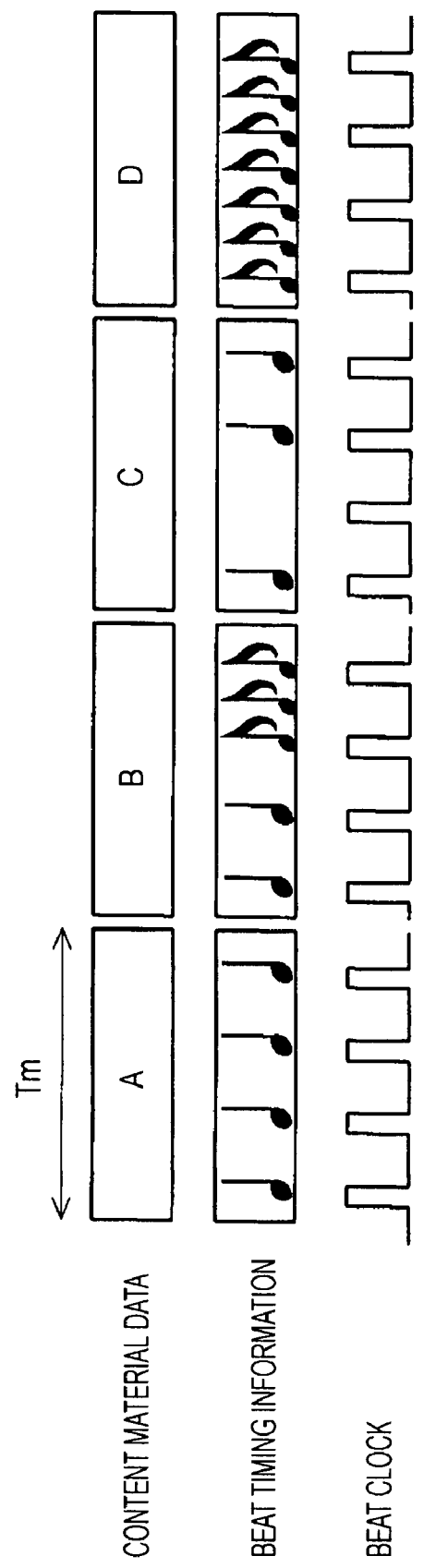
FIG. 4 illustrates a case where short music pieces in units of bars are used as content materials.

In the case of music content, to play back content, as shown in FIG. 4, one bar of a music piece is used as each of four content materials A, B, C, and D is used, and the content materials A, B, C, and D are spliced to create one piece of music content.

Sections including the content materials A through D may be MIDI or PCM (pulse width modulation) data. If they are MIDI data, beat timing information can be directly obtained, and also, the amount of computation required for expanding or shortening the content materials for generating content, which is discussed below, is small. If they are PCM data, the content materials A through D are pure sound waveforms, and thus, beat timing information is generated beforehand separately from the content materials A through D and is recorded or sent together with the content materials A through D.

Beat timing information may be calculated from the waveforms of content materials immediately before playing back the content materials. As the calculation method, the method disclosed in reference document 1 (as a PDF file, Masataka Goto: An Audio-based Real-time Beat Tracking System for Music With or Without Drum-sounds, Journal of New Music Research, Vol. 30, No. 2, pp. 159-171, June 2001) or reference document 2 (as a book, Masataka Goto: *Haku Setsu Ninshiki* (Beat/Bar Recognition (Beat Tracking)), Bit Special Number, *Konputer to Ongaku no Sekai* (World of Computer and Music) . . . *Kiso kara Furontia made* (From Base to Frontier), pp. 100-116, Kyoritsu Shuppan Co., Ltd. August 1998) can be used.

An example of generating one piece of music content by splicing content materials A, B, C, and D, such as those shown in FIG. 4, is described below. It is now assumed that the content materials A, B, C, and D all consist of one bar and have the same duration Tm.

FIRST EXAMPLE

Figure 5:
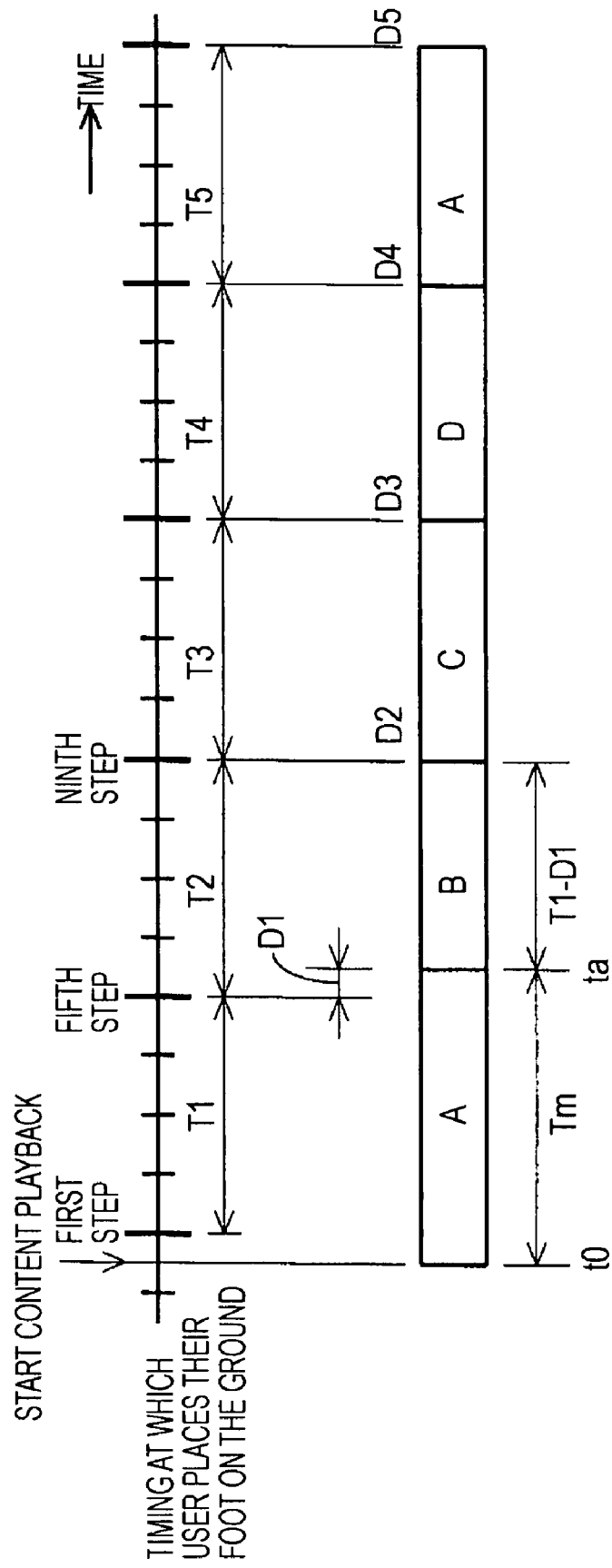
FIG. 5 illustrates a first example of a music content playback method.
Figure 6:
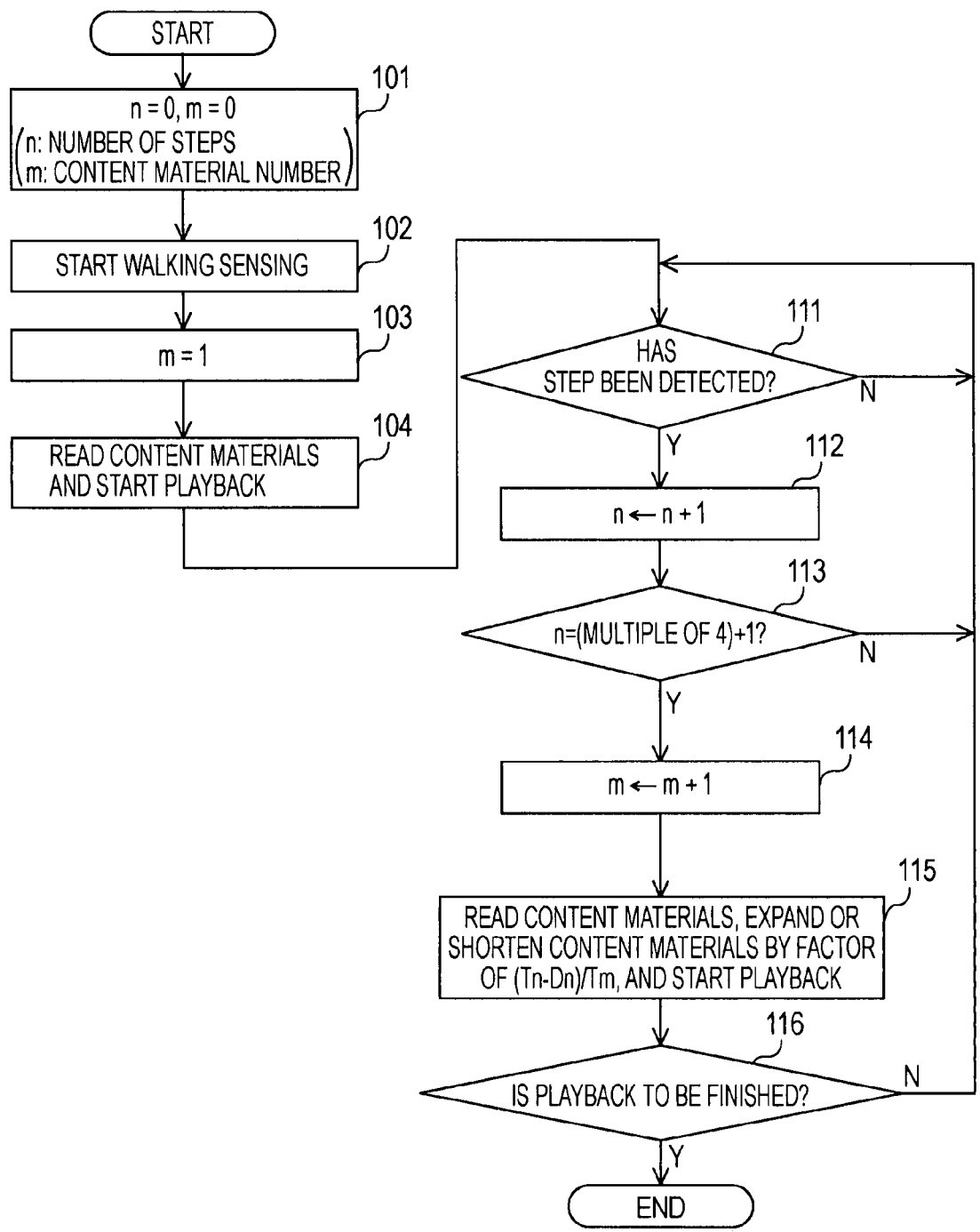
FIG. 6 illustrates an example of processing when the method shown in FIG. 5 is performed.

FIGS. 5 and 6

FIG. 5 illustrates a first example of a method for synchronizing the timing of content with the walking tempo. The method in this example is suitable when the walking tempo is constant, and the start timing of each content material is synchronized with the timing at which the user places his/her foot on the ground by expanding or shortening the content materials.

More specifically, in the example shown in FIG. 4, since there is a beat at the head of each of the bars A through D, the head of each of the bars A through D is synchronized, every four steps, with the timing at which the user places his/her foot on the ground. Although the number of steps corresponding to each bar does not have to be four, the tempos of many marching music pieces correspond to 120 beats, i.e., one beat=one step=0.5 seconds, and four steps (four beats) form one bar. Thus, if the number of steps to be synchronized with a bar is four, the head of each of the bars A through D can be synchronized with the timing at which the user places his/her foot on the ground without the need to considerably expand or shorten the content materials.

In this example, in response to an instruction to start playing back content from the user at time t0, the first bar A is played back as it is, i.e., for time Tm.

Then, assuming that the step which is first detected after the content playback start time t0 is the first step, when the fifth step is detected, time T1 for four steps from the first step to the fifth step is calculated.

Then, the time D1 between a playback end time ta of the first bar A and the time at which the fifth step is detected is calculated to determine the difference (T1−D1) between the time T1 and the time D1. The bar B is then expanded or shortened by a factor of (T1−D1)/Tm and is played back so that the difference (T1−D1) becomes equal to the playback duration of the second bar B.

The example shown in FIG. 5 is a case where the playback of the first bar A is finished after the time at which the fifth step is detected, which means D1>0, and the difference (T1−D1) is shorter than the time T1 or the time Tm, which means (T1−D1)/Tm<1, and the bar B is thus shortened and played back.

Conversely, if the playback of the first bar A is finished before the fifth step is detected, the playback of the bar A is restarted immediately, and when the fifth step is detected, the playback of the bar A is discontinued. In this case, D1<0, and the difference (T1−D1) is longer than the time T1 and may be longer than Tm. In this manner, when the difference (T1−D1) is longer than the time Tm, which means (T1−D1)/Tm>1, the bar B is expanded and played back.

Thereafter, similarly, the subsequent bars are sequentially played back so that the difference (Tn−Dn)[n=1, 2, 3, 4 . . . ] becomes equal to the playback duration of the next (n+1)th bar. When the playback of the fourth bar D is finished, the first bar A is resumed and the playback is repeated.

When the walking tempo is not changed, as in the example in FIG. 5, T1=T2=T3=T4 . . . , and Dn=0, except for D1, and thus, the head of each bar can be synchronized, every four steps, with the timing at which the user places his/her foot on the ground.

Additionally, in this example, since bars, which are content materials, are played back by being expanded or shortened, the continuity of the content materials as a music piece can be maintained.

FIG. 6 illustrates content playback processing executed by the CPU 11 of the content playback apparatus 10 shown in FIG. 1, i.e., content generation processing executed by the content generator 63 shown in FIG. 3, when the content playback method in the above-described example is employed.

In this example, the processing is started in response to an instruction to start playing back content from the user, as described above. In step 101, n=0 and m=0 where n indicates the number of steps, different from n shown in FIG. 5, and m indicates the content material number. In the example shown in FIG. 5, for the bar A, m=1, 5, 9 . . . , for the bar B, m=2, 6, 10 . . . , for the bar C, m=3, 7, 11 . . . and for the bar D, m=4, 8, 12 . . . .

Then, the process proceeds to step 102 in which walking sensing is started using the body movement sensor 51. The process then proceeds to step 103 in which m=1, and then proceeds to 104 in which the content material having m=1 is read and the playback of the content material is started.

Then, the process proceeds to step 111 to determine whether a step has been detected. If a step has been detected, the process proceeds to step 112 in which the number n of steps is incremented by 1. The process then proceeds to step 113 to determine whether the number n of steps after being incremented is equal to {(multiple of four)+1}, i.e., whether the number n of steps is the fifth step, the ninth step, the thirteenth step, . . . .

If the number n of steps after being incremented is not equal to {(multiple of four)+1}, the process proceeds from step 113 to step 111 to determine whether another step has been detected. If the number n of steps after being incremented is equal to {(multiple of four)+1}, the process proceeds from step 113 to step 114 in which the content material number m is incremented by one.

After the content material number m is incremented by one in step 114, the process proceeds to step 115. In step 115, the content material having the content material number m after being incremented is read and is expanded or shortened by a factor of (Tn−Dn)/Tm, and then, the playback of the content material is started.

Then, the process proceeds to step 116 to determine whether the playback of the content is to be finished. If the playback of the content is to be finished in response to an instruction to finish playing back the content from the user, the content playback processing (content generation processing) is completed. If the playback of the content is continued, the process returns from step 116 to step 111 to determine whether another step is detected.

Although it is not shown in FIG. 5 or 6, if the user stops walking without giving an instruction to finish playing back the content while a content material (bar) is being played back, the subsequent content materials (bars) are sequentially played back with, for example, a playback duration (Tn−Dn) when the user stops walking.

SECOND EXAMPLE

Figure 7:
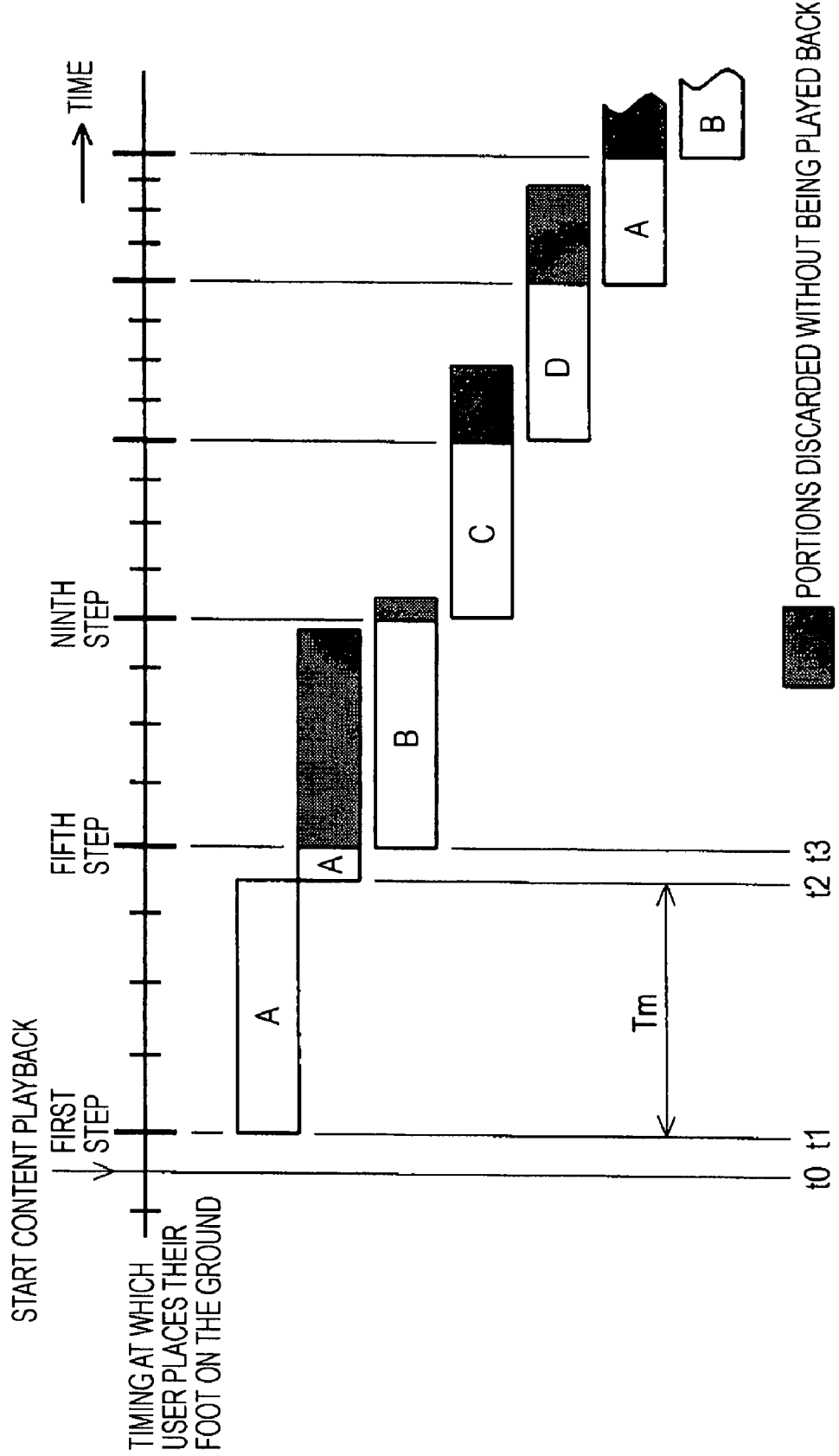
FIG. 7 illustrates a second example of a music content playback method.
Figure 8:
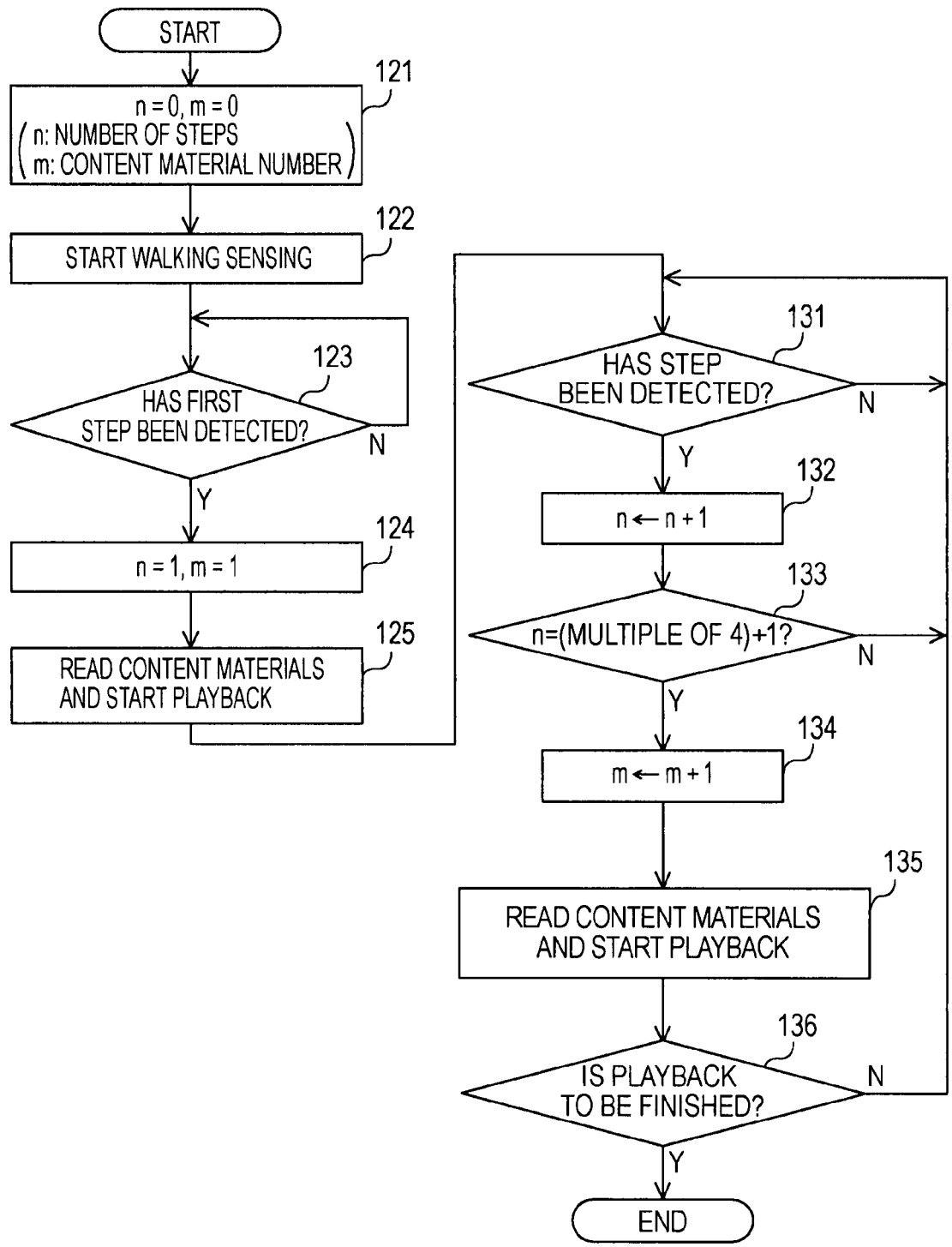
FIG. 8 illustrates an example of processing when the method shown in FIG. 7 is performed.

FIGS. 7 and 8

FIG. 7 illustrates a second example of a method for allowing the timing of content to be synchronized with the walking tempo. The example shown in this example is suitable when the walking tempo is considerably changed, and the start timing of each content material is forced to be synchronized with the timing at which the user places his/her foot on the ground without expanding or shortening the content materials.

Specifically, since there is a beat at the head of each of the bars A through D in the example shown in FIG. 4, as in the example shown in FIG. 5, the head of each of the bars A through D is synchronized, every four steps, with the timing at which the user places his/her foot on the ground.

In this example, in response to an instruction to start playing back content from the user at time t0, at time t1 when the first step is detected immediately after the time t0, the playback of the bar A is started and the bar A is played back for time Tm.

If, as shown in FIG. 7, the playback of the bar A is finished before the fifth step is detected since the time from the first step to the fifth step is longer than the time Tm, the playback of the bar A is restarted at time t2. Then, the playback of the bar A is discontinued at time t3 when the fifth step is detected, and the playback of the bar B is immediately started.

Conversely, if the fifth step is detected before the playback of the bar A is finished since the time from the first step to the fifth step is shorter than the time Tm, the playback of the bar A is discontinued and the playback of the bar B is immediately started.

The bar B is also played back until the ninth step is detected without being expanded or shortened. More specifically, if, as shown in FIG. 7, the ninth step is detected before the playback of the bar B is finished since the time from the fifth step to the ninth step is shorter than the time Tm, the playback of the bar B is discontinued, and the playback of the bar C is immediately started. Conversely, if the playback of the bar B is finished before the ninth step is detected since the time from the fifth step to the ninth step is longer than the time Tm, the playback of the bar B is restarted. Then, at the time when the ninth step is detected, the playback of the bar B is discontinued, and the playback of the bar C is immediately started.

Thereafter, similarly, the subsequent bars are sequentially played back without being expanded or shortened. When the playback of the fourth bar D is finished, the first bar A is resumed and the playback is repeated.

FIG. 7 shows an example in which the walking tempo is progressively increased and the second and the subsequent bars are not played back until the end.

In this example, the continuity of the content materials as a music piece is lost at the spliced portions of the bars. However, the awkward feeling can be reduced by fading out or fading in the bars before and after the spliced portions.

FIG. 8 illustrates content playback processing executed by the CPU 11 of the content playback apparatus 10 shown in FIG. 1, i.e., content generation processing executed by the content generator 63 shown in FIG. 3, when the content playback method in the above-described example is employed.

In this example, the processing is started in response to an instruction to start playing back content from the user, as described above. In step 121, n=0 and m=0 where n indicates the number of steps and m indicates the content material number. In the example shown in FIG. 7, for the bar A, m=1, 5, 9 . . . , for the bar B, m=2, 6, 10 . . . , for the bar C, m=3, 7, 11 . . . , and for the bar D, m=4, 8, 12 . . . .

Then, the process proceeds to step 122 in which walking sensing is started using the body movement sensor 51. The process then proceeds to step 123 to determine whether the first step has been detected. If the first step has been detected, the process proceeds to step 124 in which n=1 and m=1, and then proceeds to step 125 in which the content material having m=1 is read and the playback of the content material is started.

Then, the process proceeds to step 131 to determine whether a step has been detected. If a step has been detected, the process proceeds to step 132 in which the number n of steps is incremented by 1. The process then proceeds to step 133 to determine whether the number n of steps after being incremented is equal to {(multiple of four)+1}, i.e., whether the number n of steps is the fifth step, the ninth step, the thirteenth step, . . . .

If the number n of steps after being incremented is not equal to {(multiple of four)+1}, the process proceeds from step 133 to step 131 to determine whether another step has been detected. If the number n of steps after being incremented is equal to {(multiple of four)+1}, the process proceeds from step 133 to step 134 in which the content material number m is incremented by one.

After the content material number m is incremented by one in step 134, the process proceeds to step 135. In step 135, the content material having the content material number m after being incremented is read and the playback of the content material is started.

Then, the process proceeds to step 136 to determine whether the playback of the content is to be finished. If the playback of the content is to be finished in response to an instruction to finish playing back the content from the user, the content playback processing (content generation processing) is completed. If the playback of the content is continued, the process returns from step 136 to step 131 to determine whether another step has been detected.

Although it is not shown in FIG. 7 or 8, if the user stops walking without giving an instruction to finish playing back the content while a content material (bar) is being played back, the subsequent content materials (bars) are sequentially played back with the original time Tm.

(2-2. In the Case of Other Content)

The above-described example has been described in the context of music (music piece) content. For moving picture content or still image content, it is also preferable that moving pictures or still images are played back by allowing the content playback timing to be synchronized with user's movements.

More specifically, in the case of moving pictures, the timing of scene changes or cut changes of moving pictures is synchronized with the timing at which the user shakes or changes from swinging in one direction to swinging in another direction. In this case, as content materials, moving pictures in units of scenes or cuts are used.

In the case of still images, for example, when a plurality of still images are sequentially played back, as in slideshow display, the timing of switching from one still image to another still image is synchronized with the timing at which the user shakes or changes from swinging in one direction to swinging in another direction. In this case, as content materials, still images in units of files are used.

In the case of vibration or light content, the content playback method of this invention can also be used.

In the case of vibration content, the frequency (cycle) or the strength (amplitude) of vibrations is changed in accordance with the timing at which the user shakes or changes from swinging in one direction to swinging in another direction. In this case, as content materials, data for generating vibrations having a certain vibration pattern is used.

In the case of light content, the color (waveform) or lightness (illumination) of light is changed in accordance with the timing at which the user shakes or changes from swinging in one direction to swinging in another direction. In this case, as content materials, data for generating light having a certain color or lightness is used.

[3. Body Movement Detection Method: FIGS. 9 through 15]

Figure 9:
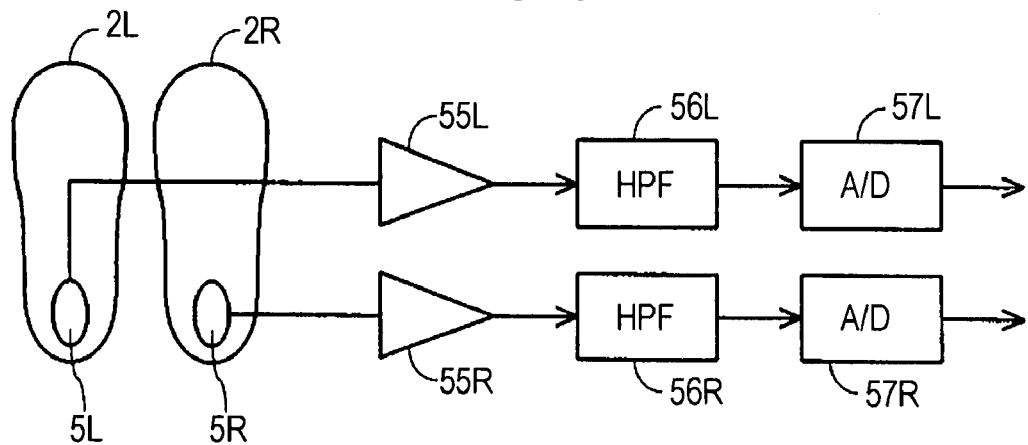
FIG. 9 illustrates an example of a body movement detector.

If, as in the example stated above, walking is detected as user's movements and the timing at which the user places his/her foot on the ground during walking is detected as the feature of the movements, the following procedure is taken. Walking sensors 5L and 5R are fixed, for example, as shown in FIG. 9, at the heels of left and right shoes 2L and 2R, respectively, worn by the user when running, or at the heels of the left and right feet of the user. Then, after output signals from the walking sensors 5L and 5R are amplified by amplifier circuits 55L and 55R, respectively, they are supplied to high-pass filters 56L and 56R, respectively, where components higher than or equal to a predetermined frequency are extracted. Then, the extracted components are converted into digital data by A/D converters 57L and 57R, and are then supplied to the bus 12 of the content playback apparatus 10 shown in FIG. 1.

Figure 10:
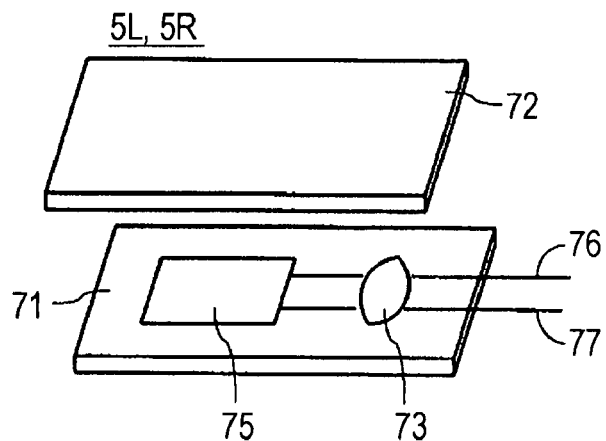
FIG. 10 illustrates an example of a walking sensor.
Figure 11:
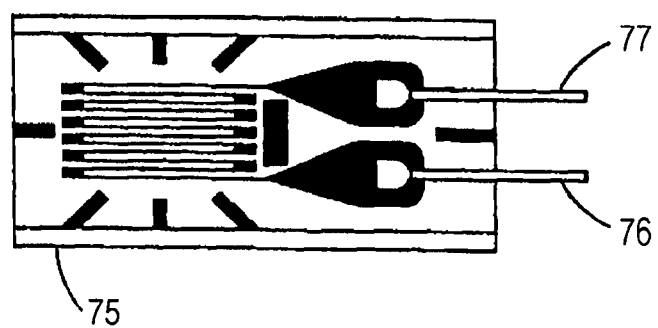
FIG. 11 illustrates an example of a strain gauge.

The walking sensors 5L and 5R are formed as strain sensors. More specifically, as shown in FIG. 10, in the state in which a strain gauge 75, such as that shown in FIG. 11, is fixed on a support plate 71 formed of, for example, a phosphor-bronze plate, and terminals 76 and 77 of the strain gauge 75 are supported on the support plate 71 by a reinforcing member 73, another support plate 72 formed of, for example, a phosphor-bronze plate, is bonded to the support plate 71.

Figure 12:
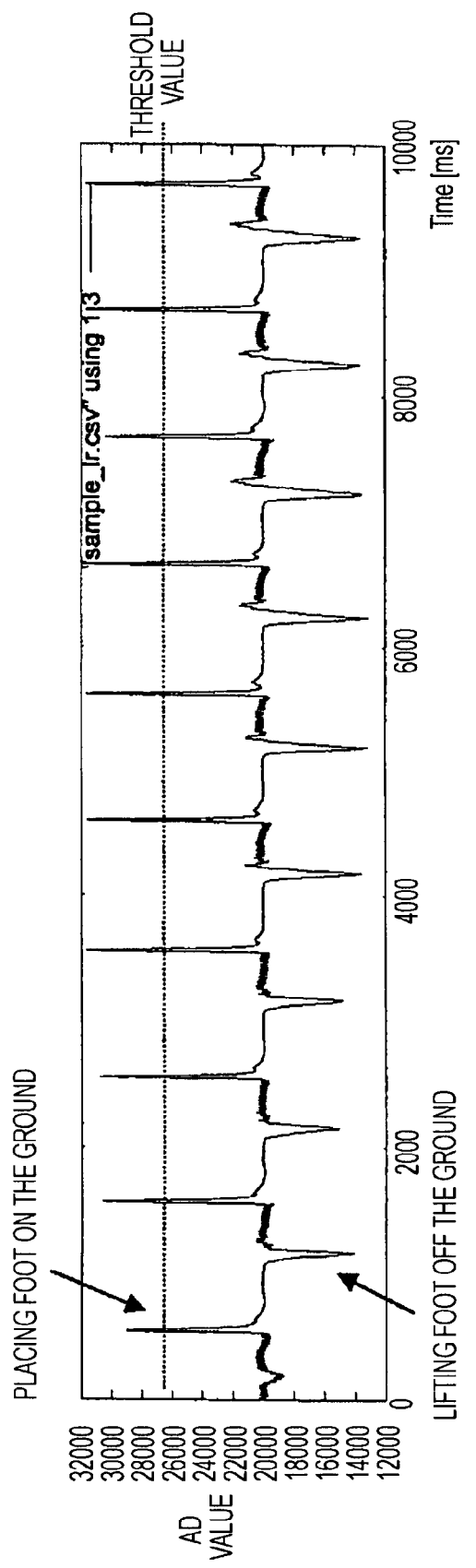
FIG. 12 illustrates an example of an output signal from a walking sensor.

Output signals from the walking sensors 5L and 5R during walking are changed, as shown in FIG. 12, in terms of the AD value (data value output from the A/D converters 57L and 57R). The output value becomes greater than a predetermined threshold at the timing at which the user places his/her foot on the ground, and becomes smaller than another threshold at the timing at which the user lifts his/her foot off the ground. Accordingly, the timing at which the user places the left or right foot on the ground can be detected from the output signal of the walking sensor 5L or 5R.

Figure 13:
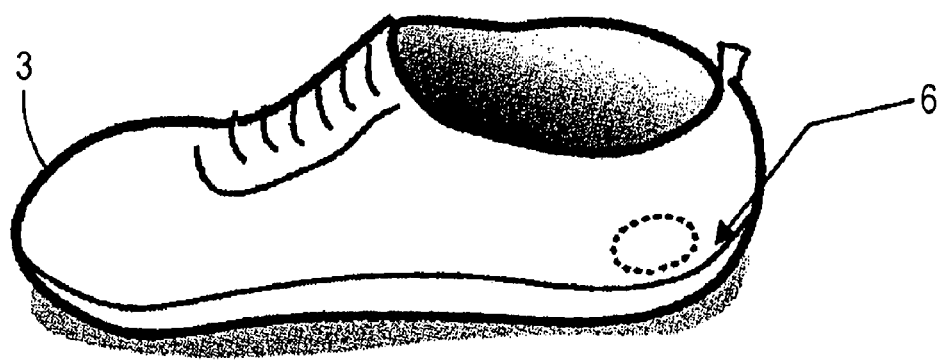
FIG. 13 illustrates another example in which a walking sensor is disposed.

FIG. 13 illustrates a case where a walking sensor 6 is disposed farther inward than the heel of a shoe 3. In this case, as the walking sensor 6, a sensor other than the above-described strain sensor, such as an acceleration sensor, a bending sensor, a pressure sensor, a range-finding sensor, a tilt sensor, a magnetic sensor, a current sensor, a charge sensor, electrostatic capacitor sensor, or an electromagnetic induction sensor, may be used. If sound is collected with a microphone, the timing at which the user places his/her foot on the ground can be detected.

The above-described example has been discussed when the timing at which the user places his/her foot on the ground is detected through the detection of walking. If the timing at which a head or a hand shakes or changes from swinging in one direction to swinging in another direction is detected through the detection of the movements of the head or the hand, the invention can be configured as follows.

Figure 14A:
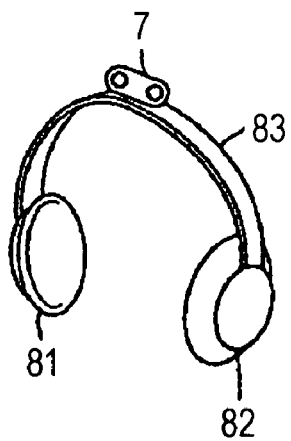
FIG. 14A illustrates an example when the movement of a head is detected.
Figure 14B:
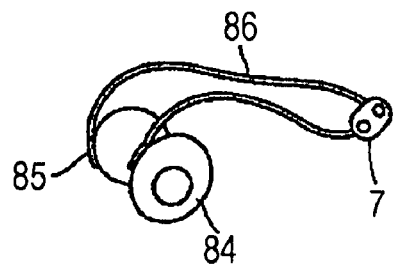
FIG. 14B illustrates an example when the movement of a head is detected.
Figure 14C:
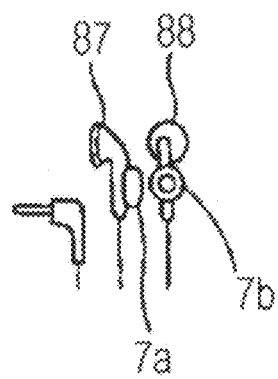
FIG. 14C illustrates an example when the movement of a head is detected.

If, for example, the timing at which the head changes from swinging in one direction to swinging in another direction is detected through the detection of the movements of the head, acceleration sensors 7, 7a, and 7b are fixed, as shown in FIGS. 14A, 14B, and 14C, on headphones worn on the head. To detect walking with an acceleration sensor, autocorrelation of sensor signals is calculated.

FIG. 14A illustrates a case where the acceleration sensor 7 is fixed on a head band 83 that interconnects left and right speakers 81 and 82 of an overhead headphone. FIG. 14B illustrates a case where the acceleration sensor 7 is fixed on a neck band 86 that interconnects left and right speakers 84 and 85 of a neckband headphone. FIG. 14C illustrates a case where the acceleration sensors 7a and 7b are fixed on speakers 87 and 88, respectively, which are inserted into the left and right ears, of an inner-ear headphone.

Figure 15:
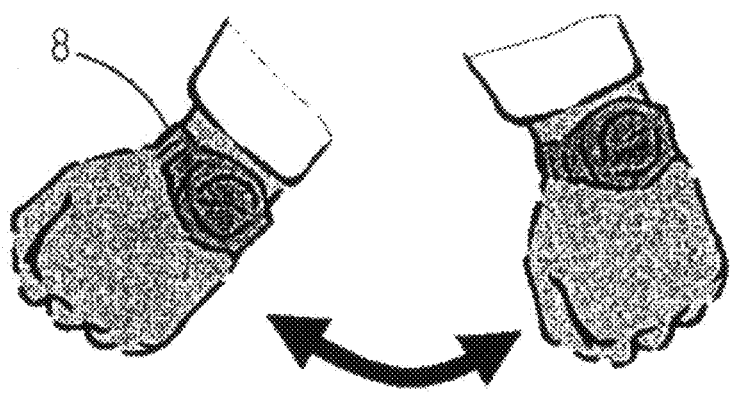
FIG. 15 illustrates an example when the movement of a hand is detected.

If the timing at which a hand changes from swinging in one direction to swinging in another direction is detected through the detection of the movements of the hand, a wristwatch-type acceleration sensor 8 is fixed on the wrist, as shown in FIG. 15.

The body movement sensor may be fixed on a portion other than a foot, a head, a neck, or a hand, such as a calf, a knee, a thigh, a waist, a trunk, an upper arm, or an elbow, or if it is fixed on a foot, it may be fixed on a portion other than a heel, such as a toe, an instep, or an ankle. If it is fixed on a hand, it may be fixed on a portion other than a wrist, such as a finger or the back of the hand. The body movement sensor may be fixed at an article worn or carried by the user, such as a shoe.

INDUSTRIAL APPLICABILITY

As described above, according to the present invention, user's movements can affect the playback of content so that the entertainment characteristic or uplifting spirits derived from content playback itself can be enhanced.

The invention claimed is:

1. A content playback method comprising:
   detecting movements of a user;
   driving a content material reader to read out content from a content materials database, wherein the content is divided into a plurality of sections according to a timing of the content;
   generating, from the sections of the content, output-content for being played back in synchronization with a feature, a cycle, or a rhythm of the movements, wherein the output-content comprises portions of sections spliced together such that start timings of sections in the output-content are synchronized with a feature, a cycle, or a rhythm of the movements; and
   playing back the output-content such that beginnings of sections in the output-content are played back in synchronization with a feature, a cycle, or a rhythm of the movements,
   wherein the output-content is generated in real time as the movements of the user are detected such that synchronization of start timings of the sections in the output-content with the movements is maintained when a user movement rate changes.

2. The content playback method according to claim 1, wherein the feature is a start point, an end point, a maximal point, a minimal point, a maximum peak point, or a minimal peak point of the movement.

3. The content playback method according to claim 1, wherein the feature is a timing at which the user places his/her foot on the ground while walking.

4. The content playback method according to claim 1, wherein the feature is a timing at which the user shakes or changes from swinging in one direction to swinging in another direction.

5. The content playback method according to claim 1, wherein the content is a music piece and the timing is a timing of a beat or a bar of the music piece.

6. The content playback method according to claim 1, wherein the content is moving pictures and the timing is a timing of scene changes or cut changes of the moving pictures.

7. The content playback method according to claim 1, wherein the content is still images and the timing is a timing of switching the still images.

8. The content playback method according to claim 1, wherein information indicating the timing is recorded on a recording medium in association with the content.

9. The content playback method according to claim 1, wherein the detecting a movement includes predicting a next movement from the previous movement detect results.

10. The content playback method according to claim 1, wherein the output-content is generated so as to be played back in synchronization with a feature, a cycle, or a rhythm of the movements by:

detecting a time difference $\Delta t$ between a timing $t_c$ of an ending of a given section $S_n$ played back as output-content and a timing $t_m$ of a given movement of a user, where $\Delta t = t_c - t_m$; and expanding or shortening the duration $T_{n+1}$ of a next section $S_n+_1$ in the output-content by a factor of $(T^* - \Delta t)/T_n$, where $T^*$ is a duration between the given movement and a prior movement, and $T_n$ is a duration of the given section $S_n$.

11. The content playback method according to claim 1, wherein the output-content is generated so as to be played back in synchronization with a feature, a cycle, or a rhythm of the movements by:

selecting, at a time when a given section $S_n$ is being played back as output-content, between (i) generating subsequent output-content by repeating a portion of the given section as output-content and (ii) generating subsequent output-content by terminating the playback of the given section $S_n$ early and outputting a next section $S_{n+1}$ as output-content, based on a timing of a detected movement of the user, such that a beginning of the next section $S_{n+1}$ in the output-content is synchronized with the detected movement of the user.

12. A content playback apparatus comprising:

detection means for detecting movements of a user;

a content material reader for reading out content from a content materials database, wherein the content is divided into a plurality of sections according to a timing of the content;

a content generator for generating, from the sections of content read by the content material reader, output-content for being played back in synchronization with a feature, a cycle, or a rhythm of the movements, wherein the output-content comprises portions of sections spliced together such that start timings of sections in the output-content are synchronized with a feature, a cycle, or a rhythm of the movements; and playback means for playing back the output-content such that beginnings of sections in the output-content are played back in synchronization with a feature, a cycle, or a rhythm of the movements, wherein the content generator is configured to generate output-content in real time as the movements of the user are detected such that synchronization of start timings of the sections in the output-content with the movements is maintained when a user movement rate changes.

13. The content playback apparatus according to claim 12, wherein the detection means is fixed at part of the body of the user or at an article worn or carried by the user.

14. The content playback apparatus according to claim 12, wherein the content is a music piece and the timing of the content comprises a beat or a bar of the music piece.

15. The content playback apparatus according to claim 12, wherein the content is moving pictures and the timing of the content comprises scene changes or cut changes of the moving pictures.

16. The content playback apparatus according to claim 12, wherein the content is still images and the timing of the content comprises a timing of switching the still images.

17. The content playback method according to claim 12, wherein the detecting a movement includes predicting a next movement from the previous movement detect results.

18. The content playback method according to claim 12, wherein the content generator is configured to generate the output-content so as to be played back in synchronization with a feature, a cycle, or a rhythm of the movements by:

detecting a time difference $\Delta t$ between a timing $t_c$ of an ending of a given section $S_n$ played back as output-content and a timing $t_m$ of a given movement of a user, where $\Delta t = t_c - t_m$; and expanding or shortening the duration $T_{n+1}$ of a next section $S_{n+1}$ in the output-content by a factor of $(T^* - \Delta \Delta t)/T_n$, where $T^*$ is a duration between the given movement and a prior movement, and $T_n$ is a duration of the given section $S_n$.

19. The content playback method according to claim 12, wherein the content generator is configured to generate the output-content so as to be played back in synchronization with a feature, a cycle, or a rhythm of the movements by:

selecting, at a time when a given section $S_n$ is being played back as output-content, between (i) generating subsequent output-content by repeating a portion of the given section $S_n$ as output-content and (ii) generating subsequent output-content by terminating the playback of the given section $S_n$ early and outputting a next section $S_{n+1}$ as output-content, based on a timing of a detected movement of the user, such that a beginning of the next section $S_{n+1}$ in the output-content is synchronized with the detected movement of the user.

* * * * *